United States Patent
Ashida et al.

(10) Patent No.: US 10,417,100 B2
(45) Date of Patent: *Sep. 17, 2019

(54) FILE SYSTEM FOR ROLLING BACK DATA ON TAPE

(71) Applicant: International Business Machines Corporation, Armonk, NY (US)

(72) Inventors: Takashi Ashida, Yamato (JP); Hiroshi Itagaki, Yokohama (JP); Setsuko Masuda, Tokyo (JP); Tsuyoshi Miyamura, Yokohama (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,766

(22) Filed: Nov. 7, 2017

(65) Prior Publication Data

US 2018/0060188 A1    Mar. 1, 2018

Related U.S. Application Data

(63) Continuation of application No. 14/822,144, filed on Aug. 10, 2015, now Pat. No. 9,886,355.

(30) Foreign Application Priority Data

Sep. 29, 2014    (JP) ................... 2014-198522

(51) Int. Cl.
*G06F 3/00*    (2006.01)
*G06F 11/14*    (2006.01)
(Continued)

(52) U.S. Cl.
CPC .......... *G06F 11/1469* (2013.01); *G06F 3/061* (2013.01); *G06F 3/065* (2013.01);
(Continued)

(58) Field of Classification Search
CPC .... G06F 3/0686; G06F 3/0682; G06F 3/0643; G06F 17/30088; G06F 11/1469;
(Continued)

(56) References Cited

U.S. PATENT DOCUMENTS 6,070,224 A    5/2000 LeCrone et al.
6,349,294 B1    2/2002 Shaath et al.
(Continued)

FOREIGN PATENT DOCUMENTS

IN    500/DEL/2014 A  *  8/2015  .......... G06F 3/0619
JP        05274201 A      10/1993
(Continued)

OTHER PUBLICATIONS

Notification of Reasons for Refusal, Patent Application No. 2014-198522, Date of Drafting: Apr. 4, 2016, 6 pages.
(Continued)

*Primary Examiner* — Augustine K. Obisesan
(74) *Attorney, Agent, or Firm* — Scott S. Dobson

(57) ABSTRACT

Rolling back data on tape in a file system is provided. A management tape is prepared. The management tape has only index files recorded thereon. The index files contain information about start positions and lengths of corresponding data files recorded on normal tapes. The index files further contain identification information for the normal tapes. A first index file of the management tape is read. The first index file is related to a data file to be rolled back. The first index file is read out from the management tape mounted on a first tape drive. The data file to be rolled back is read out of a first normal tape. The first normal tape is identified based on information in the first index file. The first normal tape is mounted on a second tape drive.

6 Claims, 4 Drawing Sheets

(51) Int. Cl.
*G06F 3/06* (2006.01)
*G06F 16/13* (2019.01)
*G06F 16/18* (2019.01)
*G06Q 10/00* (2012.01)

(52) U.S. Cl.
CPC .......... *G06F 3/0619* (2013.01); *G06F 3/0643* (2013.01); *G06F 3/0682* (2013.01); *G06F 3/0686* (2013.01); *G06F 16/13* (2019.01); *G06F 16/1805* (2019.01); *G06Q 10/00* (2013.01)

(58) Field of Classification Search
CPC ............. G06F 17/3012; G06F 11/1458; G06F 11/1461; G06F 21/80; G06F 17/30215; G06F 2212/213; G06F 3/0676; G06F 11/1435; G06F 17/30017; G06F 2212/466; G11B 2220/90; G11B 27/107; G11B 27/328
See application file for complete search history.

(56) References Cited

U.S. PATENT DOCUMENTS

| | | | |
|---|---|---|---|
| 6,789,161 | B1 | 9/2004 | Blendermann et al. |
| 8,386,733 | B1 | 2/2013 | Tsaur et al. |
| 8,832,365 | B1 | 9/2014 | Sims et al. |
| 8,935,469 | B2 | 1/2015 | Haustein et al. |
| 8,954,661 | B2 | 2/2015 | Lines |
| 2002/0156968 | A1 | 10/2002 | Haustein |
| 2003/0196036 | A1 | 10/2003 | Gibble et al. |
| 2006/0106891 | A1 | 5/2006 | Mahar et al. |
| 2007/0206920 | A1 | 9/2007 | Hirose et al. |
| 2008/0028007 | A1 | 1/2008 | Ishii et al. |
| 2008/0233860 | A1 | 9/2008 | Perry |
| 2010/0095029 | A1 | 4/2010 | Katagiri et al. |
| 2010/0142071 | A1 | 6/2010 | Wideman |
| 2010/0265612 | A1 | 10/2010 | Jaquette |
| 2010/0280651 | A1 | 11/2010 | Edling et al. |
| 2011/0122522 | A1 | 5/2011 | Itagaki et al. |
| 2011/0219184 | A1 | 9/2011 | Jaquette et al. |
| 2011/0238716 | A1 | 9/2011 | Amir et al. |
| 2011/0238905 | A1 | 9/2011 | Amir et al. |
| 2011/0238906 | A1 | 9/2011 | Amir et al. |
| 2011/0320679 | A1 | 12/2011 | Ashton et al. |
| 2012/0106309 | A1 | 5/2012 | Dishi |
| 2012/0179868 | A1 | 7/2012 | Haustein et al. |
| 2012/0320925 | A1 | 12/2012 | Park et al. |
| 2013/0117239 | A1 | 5/2013 | Hasegawa et al. |
| 2013/0321949 | A1 | 12/2013 | Cherubini et al. |
| 2014/0108720 | A1 | 4/2014 | Abe et al. |
| 2015/0127980 | A1* | 5/2015 | Klein ................... G06F 3/0619 714/15 |
| 2016/0092315 | A1 | 3/2016 | Ashida et al. |
| 2017/0139785 | A1 | 5/2017 | Ashida et al. |

FOREIGN PATENT DOCUMENTS

| | | |
|---|---|---|
| JP | 06139650 A | 5/1994 |
| JP | 2000039969 A | 2/2000 |
| JP | 2001111939 A | 4/2001 |
| JP | 2004078445 A | 3/2004 |
| JP | 2004227630 A | 8/2004 |
| JP | 2005018370 A | 1/2005 |
| JP | 2006190075 A | 7/2006 |
| JP | 2012009105 A | 1/2012 |
| JP | 2012014778 A | 1/2012 |
| JP | 2012065087 A | 3/2012 |
| JP | 2012181896 A | 9/2012 |

OTHER PUBLICATIONS

Decision to Grant a Patent, Patent Application No. 2014-198522, Date of Drafting: May 11, 2016, 6 pages.
List of IBM Patents or Patent Applications Treated as Related, dated Nov. 3, 2017, pp. 1-2.
"Method and File System for Rolling Back Data in Tape", Japan Patent Application No. 2014-198522, filed on Sep. 29, 2014, pp. 1-29.
Office Action, U.S. Appl. No. 14/822,144, dated May 26, 2017, 11 pages.
Ashida et al., "File System for Rolling Back Data on Tape", U.S. Appl. No. 15/805,797, filed Nov. 7, 2017.

* cited by examiner

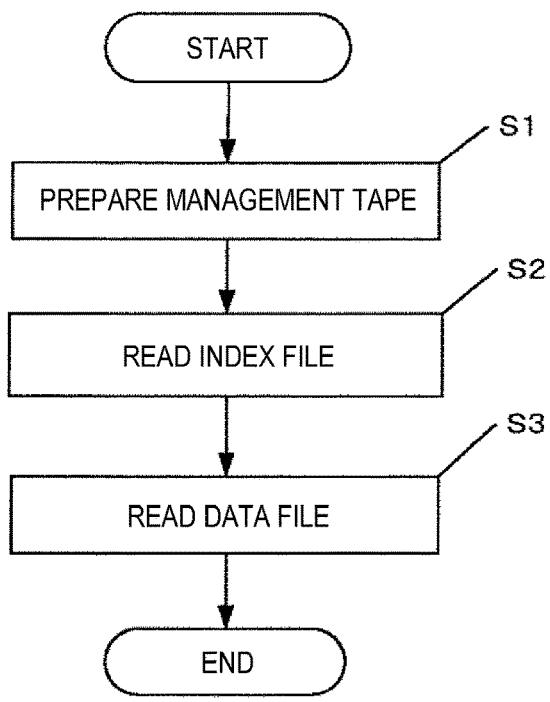
FIG. 5
FIG. 6
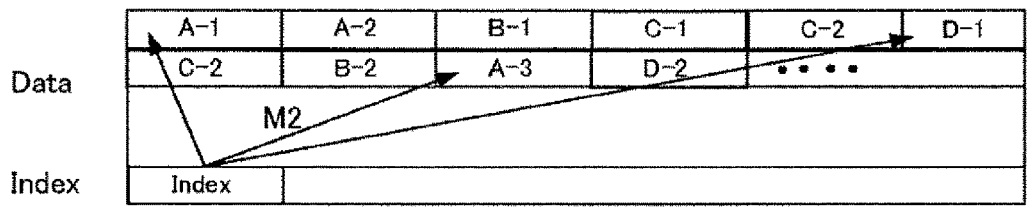
FIG. 7

FILE SYSTEM FOR ROLLING BACK DATA ON TAPE

TECHNICAL FIELD

The present invention relates to a file system including a tape drive, and more specifically, rolling back data on tape in the file system.

BACKGROUND

As a mechanism for accessing data in a tape drive as a file in a file system, for example, LTFS (Linear Tape File System) has been put to practical use. LTFS implements a file system by associating files with meta information such as indices, which indicate where data areas making up the files are located on tape.

Due to the nature of tape, LTFS is designed to add edited data, during editing of a file, to the end of data written in the past without overwriting the past data. This provides the advantage of being able to read data out of a file written in the past. In LTFS, the act of reading past data is referred to as rollback.

A Linear Tape-Open (LTO) Ultrium tape drive available for use by LTFS divides a tape into an index partition mainly used to write indices, and a data partition mainly used to write data. In the data partition, after edited data is added, an index of the data is also added to the end of the edited data. The added index (i.e., the latest index) also includes meta information about one-generation old data and data of earlier generations (i.e., data edited one generation ago and earlier). Also, each index contains information (i.e., a pointer) which identifies a location of a one-generation old index.

Rollback makes it possible to read meta information about data in a file written in the past (i.e., a few generations earlier) based on the latest index on the data partition, identifying the location and the like of data to be read out, and then reading out the data. However, if a file of data of a past generation has already been deleted (logically) in the file system, since the index of data edited after the deletion does not contain meta information about the deleted data, the location and the like of the deleted data cannot be identified directly from the latest index created after the deletion.

In that case, information (a pointer) which identifies the location of the one-generation old index is read out of the latest index, and information (a pointer) which identifies the location of the two-generation old index is read out of the one-generation old index, and so on. Read operations are thus repeated by going back to previous indices to identify the location and the like of the deleted data from the index recorded before the deletion, and thereby the file of the deleted data is read.

SUMMARY

According to one embodiment of the present invention, a method for rolling back data on tape in a file system is provided. The method includes: preparing a management tape with only index files recorded thereon, the index files containing information about start positions and lengths of corresponding data files recorded on normal tapes, and the index files further containing identification information for the normal tapes; reading a first index file of the management tape, wherein the first index file is related to a data file to be rolled back, wherein the first index file is read out from the management tape mounted on a first tape drive; and reading the data file to be rolled back out of a first normal tape, wherein the first normal tape is identified based on information in the first index file, and wherein the first normal tape is mounted on a second tape drive.

According to another embodiment of the present invention, a file system which allows data on tape to be rolled back using a management tape is provided. The file system includes: a host; a first tape drive adapted to mount normal tapes with data files recorded thereon; and a second tape drive adapted to mount a management tape with only index files recorded thereon, the index files containing information about start positions and lengths of corresponding data files recorded on the normal tapes and the index files further containing identification information about the normal tapes, wherein the host reads the index file related to a data file to be rolled back out, wherein the index file is read back out of the management tape mounted on the second tape drive, and the host reads the data file to be rolled back out of the normal tape identified based on information in the index file, the normal tape being mounted on the first tape drive.

According to another embodiment of the present invention, a computer program product for rolling back data on tape in a file system is provided. The program is stored on non-transitory computer readable storage media and controls a computer to perform a method, the method including: preparing a management tape with only index files recorded thereon, the index files containing information about start positions and lengths of corresponding data files recorded on normal tapes, and the index files further containing identification information for the normal tapes; reading a first index file of the management tape, wherein the first index file is related to a data file to be rolled back, wherein the first index file is read out from the management tape mounted on a first tape drive; and reading the data file to be rolled back out of a first normal tape, wherein the first normal tape is identified based on information in the first index file, and wherein the first normal tape is mounted on a second tape drive.

BRIEF DESCRIPTION OF THE DRAWINGS

FIG. 5 is a diagram showing a flow of a method according to an embodiment of the present invention;

FIG. 6 is a diagram showing a configuration example of a management tape according to an embodiment of the present invention;

FIG. 7 is a diagram showing a configuration example of a management tape according to an embodiment of the present invention;

DETAILED DESCRIPTION

Figure 1:
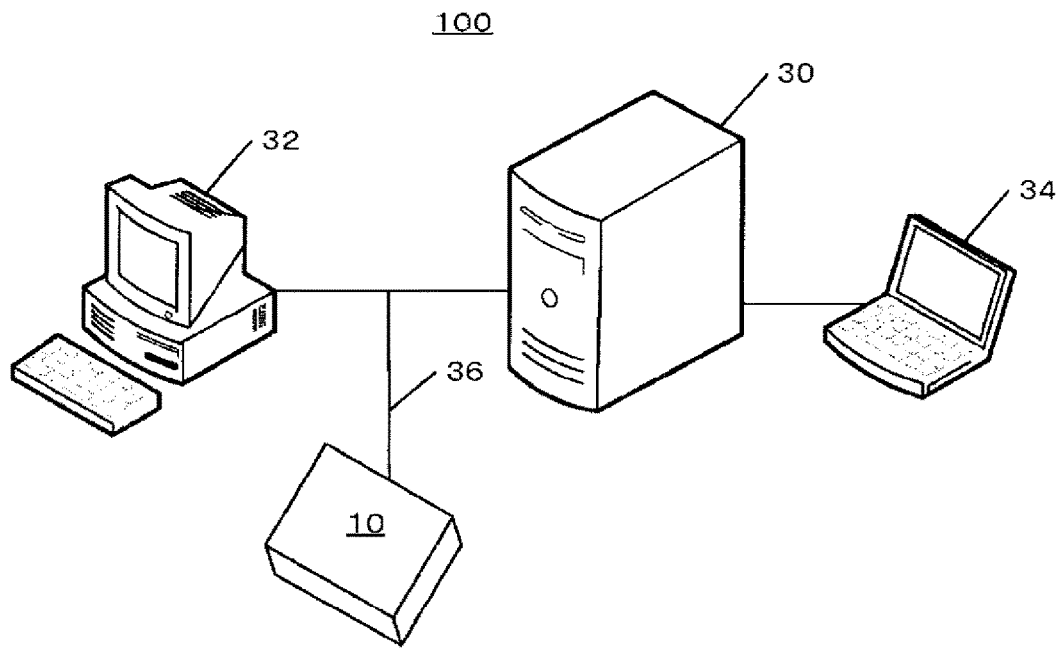
FIG. 1 is a diagram showing a configuration example of a file system according to an embodiment of the present invention.

A first aspect of the present invention provides a method for rolling back data on tape in a file system. The method comprises the steps of: (a) preparing a management tape with only index files recorded thereon, the index files containing information about start positions and lengths of respective data files recorded on normal tapes and identification information about the normal tapes; (b) reading the index file related to a data file to be rolled back out of the management tape mounted on a tape drive; and (c) reading the data file to be rolled back out of the normal tape identified based on information in the read index file and mounted on the tape drive.

According to the first aspect of the present invention, since location information and the like about the data file to be rolled back is read out of the management tape on which only index files have been recorded, the read can be performed in a short time and consequently the targeted data file can be read out quickly. Also, even when a rollback process is canceled halfway through, since no processing request is made to the normal tape on which the data file has been recorded, a next processing request can be made to the normal tape without waiting for completion of seeks on the management tape.

A second aspect of the present invention provides a file system which allows data on tape to be rolled back using a management tape. The file system comprises: (a) a host; (b) a first tape drive adapted to mount normal tapes with data files recorded thereon; and (c) a second tape drive adapted to mount a management tape with only index files recorded thereon, the index files containing information about start positions and lengths of respective data files recorded on the normal tapes and identification information about the normal tapes.

The host reads the index file related to a data file to be rolled back out of the management tape mounted on the second tape drive and reads the data file to be rolled back out of the normal tape identified based on information in the index file and mounted on the first tape drive.

According to the second aspect of the present invention, using the second tape drive different from the first tape drive on which the normal tape is mounted, location information and the like about the data file to be rolled back is read out of the management tape on which only the index files have been recorded. This allows the read to be performed in a short time and consequently the targeted data file can be read out of the first tape drive quickly. Also, even when a rollback process is canceled halfway through on the second tape drive, since no processing request is made on the first tape drive to the normal tape on which the data files have been recorded, a next processing request can be made to the normal tape on the first tape drive without waiting for completion of seeks on the management tape on the second tape drive.

Embodiments of the present disclosure recognize that utilizing LTFS to access files on a tape drive may provide the advantage of being able to read data out of a file written in the past. Embodiments recognize a demand for a mechanism which, in performing rollback to read deleted data, allows an index to be read out retrospectively in a short time and also allows the rollback to be canceled easily. Some embodiments of the present invention provide a file system which can provide such a mechanism as well as a method for rolling back data on tape in the file system.

Embodiments further recognize that there is a problem in that the rollback performed to read the deleted data takes time. This is because each index in the data partition is written between data items, making it necessary to retrace indices one by one until the index of a desired generation is found, and thereby involving a large number of seeks (tape and head movements and the like).

Also, once a seek is started, the tape drive cannot accept another request until the seek has been processed. This presents another problem in that once rollback is started, processing of the rollback cannot be canceled halfway through.

Embodiments of the present invention will be described with reference to the drawings. Note that in the following description, the embodiments of the present invention will be described in comparison with contents of a conventional technique as required.

FIG. 1 is a diagram showing a configuration example of a file system in which a method according to an embodiment of the present invention is implemented. The file system 100 includes a tape drive 10, a host (server) 30, and PCs (terminals) 32 and 34, which are capable of intercommunications via a network 36. Although a single tape drive 10 and a single host (server) 30 are shown in FIG. 1, this is merely intended for illustration purposes, and two or more tape drives 10 may be included, for example, as a tape library, and two or more hosts (servers) 30 may be included as well.

The file system 100 can be, for example, LTFS. Once a tape cartridge is inserted into a tape drive, LTFS allows direct access to any file saved in the tape cartridge as with an HDD and a USB memory or other removable recording media including a CD-R. To build a file system on a tape drive, an LTO Ultrium (such as LTO-5) tape drive can be used, for example. With the LTO Ultrium tape drive, it is necessary that the tape used has partitions. The partitions will be described later.

Figure 2:
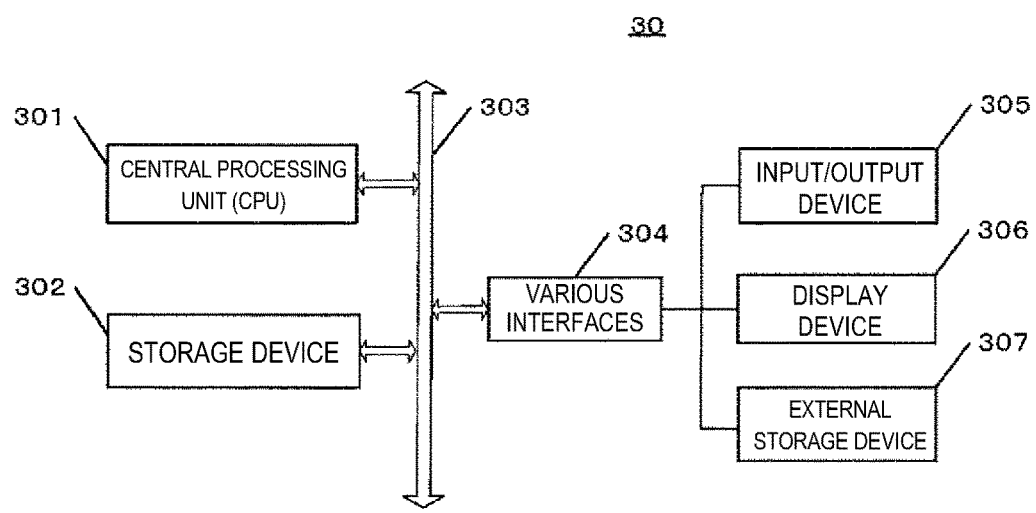
FIG. 2 is a diagram showing a configuration example of a host in the file system according to an embodiment of the present invention.

FIG. 2 is a diagram showing a configuration example of the host (server) 30 shown in FIG. 1. The host (server) 30 includes a central processing unit (CPU) 301, a storage device 302, and various interfaces 304 interconnected via a bus 303. The term "various interfaces 304" is used as the general term which includes an input interface, an output interface, an external storage interface, and an external communications interface. The interfaces are connected with appropriate one or more of an input/output device 305, such as a keyboard, mouse, and communications adapter; a display device 306, such as a CRT and LCD; and an external storage device 307, such as a USB-connected semiconductor memory and HDD. The storage device 302 can include semiconductor memories such as a RAM and ROM as well as an HDD and the like. A function (a method) of an embodiment of the present invention is implemented when the host (server) 30 calls and executes predetermined software stored, for example, in the storage device 302 or 307.

Figure 3:
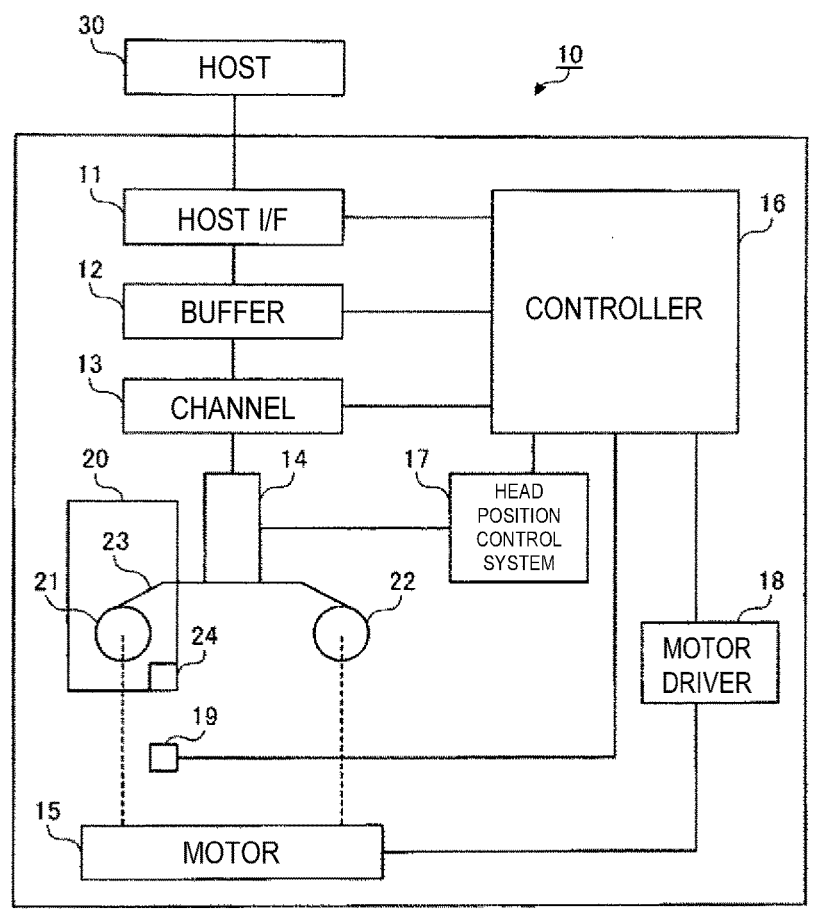
FIG. 3 is a diagram showing a configuration example of a tape drive in the file system according to an embodiment of the present invention.

FIG. 3 is a diagram showing a configuration example of a tape drive available for use in an embodiment of the present invention. The tape drive 10 includes a host interface (hereinafter referred to as the "host I/F") 11, a buffer 12, a channel 13, a head 14, and a motor 15 as well as a controller 16, a head position control system 17, and a motor driver 18. Furthermore, a tape cartridge 20, which can be inserted and loaded in the tape drive 10, is illustrated here as well. The tape cartridge 20 contains a tape 23 wound on reels 21 and 22. Along with rotation of the reels 21 and 22, the tape 23 moves in a longitudinal direction from the reel 21 to the reel 22 or from the reel 22 to the reel 21. Note that although a magnetic tape is illustrated as the tape 23 by way of example, a tape medium other than magnetic tape may be used alternatively.

The tape cartridge 20 also contains a cartridge memory (CM) 24. The CM 24 records, for example, information as to how data has been written on the tape 23. Then, fast data access is enabled by checking, for example, indices of data written into the tape 23 and a usage situation of the tape 23, in a contactless manner using, for example, an RF interface. Note that an interface, such as the RF interface, used to access the CM 24 is shown in FIG. 2 as a cartridge memory interface (hereinafter referred to as the "CM I/F") 19.

Host I/F 11 communicates with the host (server) 30, another PC 32, or the like. For example, from an OS of the host 30, the host I/F 11 receives a command to write data into the tape 23, a command to move the tape 23 to a desired position, and a command to read data out of the tape 23. In the example of LTFS described above, data in the tape drive can be referred to directly from a desktop OS or the like and a file can be opened by double-clicking or copied by dragging and dropping, similar to handling a file on the HDD.

The buffer 12 is a memory configured to temporarily store data to be written into the tape 23 or data read out of the tape 23. For example, the buffer 12 is constructed from a DRAM. Also, the buffer 12 is made up of multiple buffer segments, each of which stores a data set. A data set is a unit of data in which the data is read or written with respect to the tape 23.

The channel 13 is a communications path used to send the data to be written into the tape 23 to the head 14 and receive the data read out of the tape 23 from the head 14. As the tape 23 moves in the longitudinal direction, the head 14 writes information into the tape 23 or reads information out of the tape 23. The motor 15 turns the reels 21 and 22. Note that although the motor 15 is represented by one rectangle in FIG. 3, preferably a motor 15 is provided for each of the reels 21 and 22 for a total of two motors.

On the other hand, the controller 16 controls the entire tape drive 10. For example, based on a command accepted by the host I/F 11, the controller 16 controls data writes and reads into/from the tape 23. Also, the controller 16 controls the head position control system 17 and motor driver 18. The head position control system 17 is a system designed to track a desired lap. Here, the lap is a group of multiple tracks on the tape 23. When it becomes necessary to switch the lap, it also becomes necessary to electrically switch the head 14, and such switching is controlled by the head position control system 17.

The motor driver 18 drives the motor 15. Note that when two motors 15 are used as described above, two motor drivers 18 are provided as well. The CM I/F 19 is implemented, for example, by an RF reader-writer, and is designed to write and read information into/from the CM 24.

Now, configurations of a partition and index in LTFS in which the present invention is embodied will be described. LTFS uses a logical block on tape called a partition which has come to be supported by LTO-5 and subsequent generations of LTO. LTFS uses two types of partitions: an index partition and a data partition. The data partition is made up of data itself which makes up a file, and index information written when predetermined conditions are met after completion of a file write. The index partition stores the latest index information, which is read when a cartridge is loaded, and makes it possible to determine where on a medium a file exists.

Figure 4:
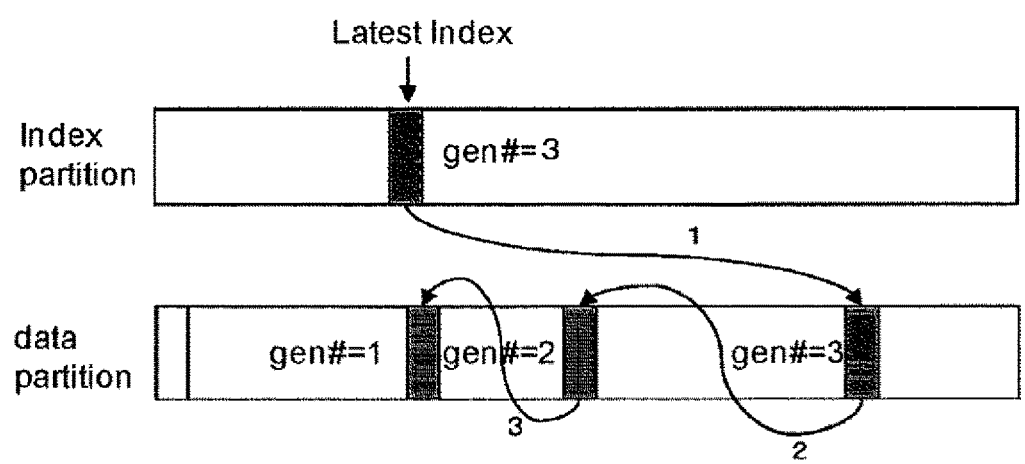
FIG. 4 is a diagram showing rollback according to a conventional method.

FIG. 4 shows a configuration example of a conventionally available index partition and data partition. FIG. 4 also shows a rollback-based index reading procedure according to a conventional method. In the example of FIG. 4, the latest index (gen #=3) in the index partition is read out first, a location and the like of the latest index (gen #=3) in the data partition are acquired, and then the latest index (gen #=3) is read out (arrow 1). A location and the like of a one-generation old index (gen #=2) are acquired from the index (gen #=3), and then the index (gen #=2) is read out (arrow 2). Similarly, a location and the like of a one-generation old index (gen #=1) are acquired from the index (gen #=2), and then the index (gen #=1) is read out (arrow 2).

The above flow makes it possible to acquire information about a location and the like of a targeted data file of gen #=1 by rollback and to read the data file. In this case, as already described above, each index in the data partition is written between data items, making it necessary to retrace indices one by one as described above until the index of a desired generation is found, and thereby involving a large number of seeks (tape and head movements and the like). Embodiments of the present invention provide a method, described below, that makes it possible to read an index of a desired generation in a short time by avoiding such a large number of seeks.

FIG. 5 is a diagram showing a flow of a method according to an embodiment of the present invention. The flow shown in FIG. 5 is a basic flow of the method. The flow in FIG. 5 can be implemented using, for example, the configuration of the file system shown in FIGS. 1 to 3. More specifically, the method provided by embodiments of the present invention is implemented when the host (server) 30 in FIG. 1 calls and executes predetermined software stored in the storage device 302 or 307.

In step S1, a management tape is prepared. The management tape means a tape on which only index files are recorded, the index files containing information about start positions and lengths of respective data files recorded on normal tapes and identification information (Id) about the normal tapes. In some embodiments of the present invention, the management tape with only the index files recorded thereon is used in addition to the normal tapes. The management tape will be further described in detail later.

In step S2, the index file containing meta information (location and the like) about a data file to be rolled back is read out of the management tape mounted on the tape drive. The tape drive used to mount the management tape may be the same as or different (i.e., a second tape drive) from a tape drive (i.e., the first tape drive) on which the normal tape (i.e., the user tape) is mounted. In so doing, a tape drive dedicated to the management tape may be provided so that the index file can be read promptly in response to a request from the host. A description of how the index file is read out of the management tape will be given later together with details of the management tape.

In step S3, after the normal tape identified based on information in the index file read out of the management tape is mounted on the tape drive (i.e., the first tape drive), the data file to be rolled back is read out of the normal tape. The reading operation is performed in a manner similar to when the data file is usually read out of the normal tape.

Example embodiments of the management tape will be described with reference to FIGS. 6 and 7. FIGS. 6 and 7 show conditions in which multiple index files have already been recorded on a tape.

In the example of FIG. 6, the management tape is divided into multiple partitions 0 to X. The partitions 0 to X are assigned to normal tapes A to X, respectively. For example, partition 0 is assigned to tape A, partition 2 is assigned to tape C, and so on.

The index files of each tape are added one after another to a corresponding one of the partitions. For example, each time an index file of tape B is created (updated), the index file, such as B-1, B-2, B-3, and so on, is added to partition 1. The addition is made with a predetermined timing, for example, being timed with a tape synchronization or a tape unmount process.

In the example of FIG. 6, it is necessary to maintain information regarding which tape corresponds to which partition, which can be done by saving a correspondence table externally or creating a partition for use in saving a correspondence table on the tape. In this example, since the index files of each tape are written consecutively, all the index files can be read sequentially. In so doing, unlike the conventional method (FIG. 4), the indices are read out in sequence in the chronological order of generations as indicated by arrow M1 in FIG. 6.

With the conventional method (FIG. 4), each index file is written between items of user data and consequently, locations of indices on the tape are unknown, making it necessary to derive the index of an old generation from the index of a new generation. However, in the example of FIG. 6, since only the index files are written on the tape, making it unnecessary to find out index locations, there is no problem in reading out indices in the chronological order of generations. In this example, the tape is divided into multiple partitions at the expense of capacity. This is suitable when there are a small number of tapes or when synchronization occurs frequently and a large number of index files are written, resulting in high costs of a seek process.

In the example of FIG. 7, the management tape includes a data partition (Data) and an index partition (Index) as with normal LTO Ultrium tapes. The index file of each tape is written into the data partition (Data) as one item of data. In FIG. 7, the first index file of tape A, second index file of tape A, first index file of tape B, and so on are added to the data partition (Data) as A-1, A-2, B-1, and so on, respectively. In so doing, each index in the data partition (Data) contains a file name which can identify the tape name (Id), generation, and the like.

Then, an index which represents a pointer (location information) to the data (index file) added to the data partition (Data) is written into the index partition (Index). Consequently, since the location of a desired index to be read during rollback can be identified by reading the index in the index partition (Index), it is possible to move directly to the index of a desired generation as indicated by arrow M2 in FIG. 7 without the need to read the indices in sequence beginning with the first or last index.

In the example of FIG. 7, the index files of all the tapes are written into one data partition (Data), allowing the capacity of the tape to be used effectively. Consequently, this method is effective when there are a large number of tapes, making it difficult to divide the management tape into as many partitions as there are tapes as shown in FIG. 6. On the other hand, when one wants to read all the indices of each tape, it is not possible to read the indices sequentially. However, the index file is normally small relative to user data, making a distance between the index files on the tape shorter than on the normal tape in many cases, and consequently it is expected that a seek time taken to read an index file is also shorter than in a process with a normal tape.

Figure 8:
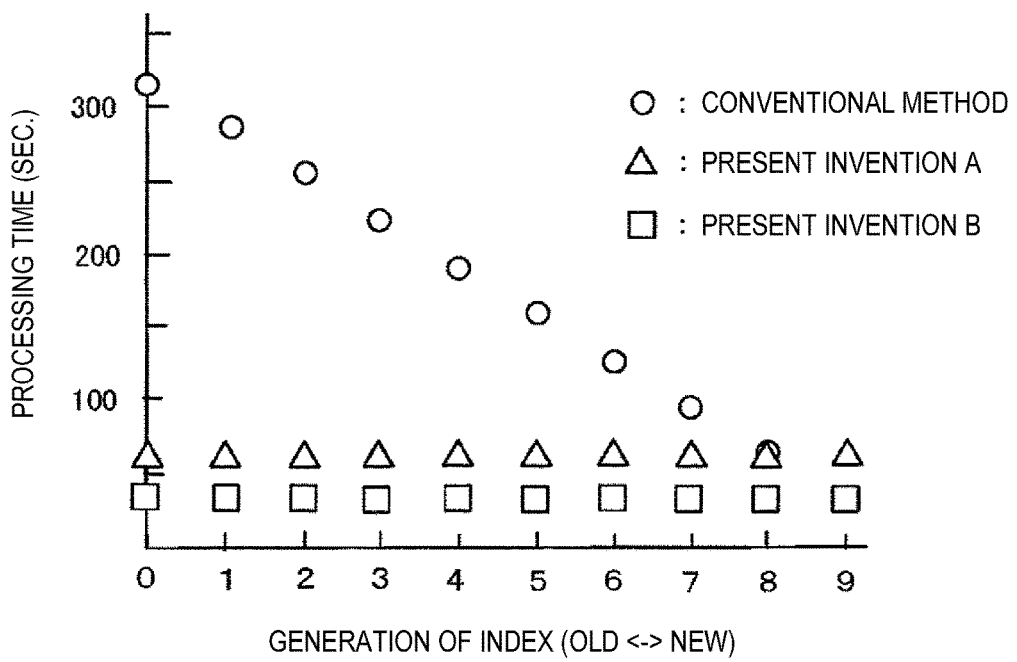
FIG. 8 is a diagram showing effects of a method according to an embodiment of the present invention.
Figure 9:
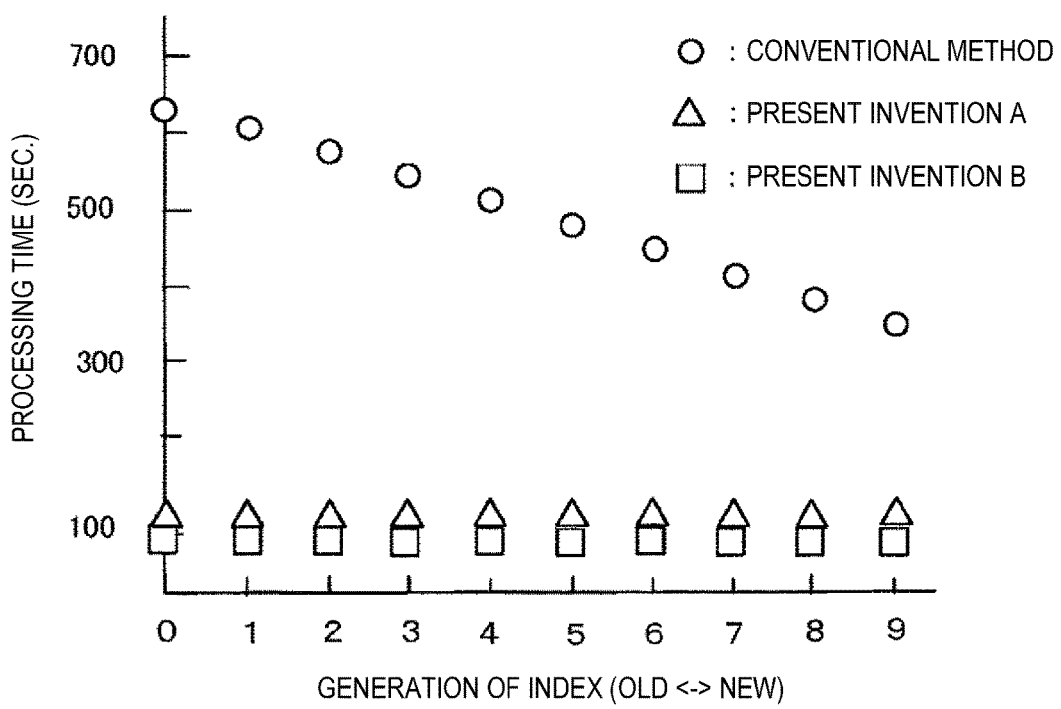
FIG. 9 is a diagram showing effects of a method according to an embodiment of the present invention.

Effects of the method according to embodiments of the present invention will be described with reference to FIGS. 8 and 9. Specifically, the processing time required for rollback will be compared between embodiments of the present invention and the conventional method. FIGS. 8 and 9 show simulation results (described later) of the processing time. The abscissa represents the generation of indices while the ordinate represents the processing time required for rollback. The larger the abscissa is, the newer the generation of the index is. In other words, the smaller the abscissa is, the older the generation is.

The time required to reach index X ($0<=X<G$) will be calculated for a tape which has G indices (index 0 to index G-1) in total. However, this calculation is a rough estimate intended to find a rough figure, and it is necessary to take acceleration or deceleration of the tape into consideration to find a precise figure. On an LTO-5 tape drive, tape running speed during a seek is 10 m/sec while running speed during a read is 8 m/sec. Also, longitudinal length of the LTO-5 tape is approximately 800 m.

In order to go back one generation, the conventional method requires the following three processes to be performed:
1. Index file seek,
2. Backhitch (rewind) for starting a read action, and
3. Data read.

If it is assumed that a seek distance is ⅓ the length of the tape on average, the seek time is 800/3/10 seconds. Empirically, backhitch time is set to 5 seconds. Reading of data depends on the index file size, but in many cases, data is sized to fit well within one data set (DS), which is a unit used in reading and writing data in LTO format, and thus data-reading time can be set to the time required to read one DS. The length of one DS corresponds to approximately 10 cm, and thus the data-reading time is 0.1/8 seconds. Thus, the time required to rewind the tape one generation is:

$$800/3/10+5+0.1/8 \approx 31.68 \text{ seconds.}$$

This is repeated (G−X) times, and thus a total processing time T1 required for rollback is $$T1=(G-X)*31.68 \text{ seconds.}$$

In example 1 of the method according to an embodiment of the present invention (method of FIG. 6), an index file is read from the beginning of the tape. Thus, necessary actions are a seek for the beginning of the tape at the start of the process, backhitch, and reading of as many data sets as indices. Times required for these actions are calculated in a manner similar to the conventional method described above and are 800/3/10, 5, and 0.1/8*X, respectively. Thus, a total processing time T2 required for rollback is:

$$T2=800/3/10+5+0.1/8*X=31.67+0.0125X \text{ seconds.}$$

In example 2 of the method according to an embodiment of the present invention (method of FIG. 7), an index is read out of the index partition (Index), and then going to the desired index file based on the information about the index, data is read out. That is, seeking, backhitching, and reading are each repeated twice. Thus, a total processing time T3 required is:

$$T3=(800/3/10+5+0.1/8)*2 \approx 63.36 \text{ seconds.}$$

FIG. 8 shows rollback time plotted as processing time on the ordinate, assuming that the total number of indices G=10. The rollback time (processing time) is affected greatly by the number of seeks, and in some cases the conventional method can complete rollback in a shorter time depending on the value of G−X. However, it can be seen from FIG. 8 that in most cases, the methods according to embodiments of the present invention can complete rollback in a shorter time both in Example 1 and Example 2. In particular, it can be seen that the older the generation is, the more quickly the methods according to embodiments of the present invention can perform rollback.

Normally, a rollback operation is performed in the following three steps:
1. List information on all the indices on the tape.
2. Select a desired generation to be rolled back from the listed information.
3. Roll back to the specified generation.

The calculations described above provide a rough estimate of the time required in step 3, although the listing time in step 1 needs to be added, as described below.

With the conventional method and example 1 of the method according to an embodiment of the present invention (method of FIG. 6), listing is an operation similar to the operation of rolling back all generations, and the required times are G*31.68 seconds and 31.67+0.0125X seconds, respectively. In example 2 of the method according to an embodiment of the present invention (method of FIG. 7), if all the information to be listed is saved in indices in the index partition (Index), all that is necessary is to read the desired index, and the required time is the time of seek for the index in the index partition (Index) plus the read time, which equals 31.68 seconds. From the above calculations, the total processing times of steps 1 and 3 according to the respective methods are as follows:
Conventional method: (2G−X)*31.68 seconds
Example 1 of an embodiment of the present invention: 63.36+0.025X seconds
Example 2 of an embodiment of the present invention: 95.04 seconds This is represented graphically in FIG. 9, assuming that G=10. It can be seen that the processing time taken for the entire rollback operation is always shorter with the methods according to embodiments of the present invention than with the conventional method. In particular, as in the case of FIG. 8, it can be seen that the older the generation is, the more quickly the method according to embodiments of the present invention can perform rollback.

Embodiments of the present invention have been described with reference to the drawings. However, the present invention is not limited to the embodiments. Furthermore, the present invention can be embodied in forms resulting from various improvements, modifications, or changes based on the knowledge of those skilled in the art without departing from the spirit and scope of the invention.

To provide a method for rolling back data on tape in a file system in a short time. A method according to the present invention includes the steps of (a) preparing a management tape with only index files recorded thereon, the index files containing information about start positions and lengths of respective data files recorded on normal tapes and identification information about the normal tapes; (b) reading the index file related to a data file to be rolled back out of the management tape mounted on a tape drive; and (c) reading the data file to be rolled back out of the normal tape identified based on information in the read index file and mounted on the tape drive.

What is claimed is:

1. A computer program product for rolling back data on tape in a file system, the computer program product comprising a nontransitory computer-readable storage medium having program instructions embodied therewith, the program instructions executable by a processor to perform a method comprising:
   preparing a management tape with only index files recorded thereon, the index files containing information about start positions and lengths of corresponding data files recorded on normal tapes, and the index files further containing identification information for the normal tapes;
   reading a first index file of the management tape, wherein the first index file is related to a data file to be rolled back, wherein the first index file is read out from the management tape mounted on a first tape drive; and
   reading the data file to be rolled back out of a first normal tape, wherein the first normal tape is identified based on information in the first index file, and wherein the first normal tape is mounted on a second tape drive.

2. The computer program product according to claim 1, wherein the method further comprises:
   adding an updated index file to the management tape with a predetermined timing, wherein the updated index file is generated each time a data file recorded on the normal tapes is updated.

3. The computer program product according to claim 2, wherein:
   the management tape includes a plurality of partitions, each of the plurality of partitions corresponding to a different normal tape of the normal tapes; and
   the updated index file is added to a partition of the plurality of partitions that corresponds to the normal tape on which the updated data file is recorded.

4. The computer program product according to claim 2, wherein the management tape includes a data partition and an index partition, and wherein adding the updated index file to the management tape includes adding the updated index file to the data partition.

5. The computer program product according to claim 3, wherein the method further comprises:
   saving a correspondence table containing information on which of the normal tapes corresponds to which of the plurality of partitions.

6. The computer program product according to claim 4, wherein the index partition of the management tape contains an index with location information for index files stored in the data partition.

* * * * *